(12) United States Patent
Gao et al.

(10) Patent No.: US 8,873,204 B1
(45) Date of Patent: Oct. 28, 2014

(54) CURRENT-PERPENDICULAR-TO-THE-PLANE (CPP) MAGNETORESISTIVE (MR) SENSOR STRUCTURE WITH MULTIPLE STACKED SENSORS AND CENTER SHIELD WITH COFEB INSERTION LAYER

(71) Applicant: HGST Netherlands B.V., Amsterdam (NL)

(72) Inventors: Zheng Gao, San Jose, CA (US); Stefan Maat, San Jose, CA (US); Alexander M. Zeltser, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/341,485

(22) Filed: Jul. 25, 2014

(51) Int. Cl.
*G11B 5/39* (2006.01)
(52) U.S. Cl.
USPC .......................................................... 360/319
(58) Field of Classification Search
USPC .......... 360/319, 314, 313, 317, 322, 320, 321
See application file for complete search history.

(56) References Cited

U.S. PATENT DOCUMENTS

| | | | |
|---|---|---|---|
| 7,289,304 B2 | 10/2007 | Carey et al. | |
| 7,298,597 B2 * | 11/2007 | Carey et al. | 360/324.2 |
| 7,453,671 B1 | 11/2008 | Nibarger et al. | |
| 8,427,791 B2 | 4/2013 | Gao et al. | |
| 8,576,518 B1 | 11/2013 | Zeltser et al. | |
| 8,617,644 B2 | 12/2013 | Carey et al. | |
| 8,638,530 B1 | 1/2014 | Hsu et al. | |
| 2010/0091414 A1 * | 4/2010 | Yuasa et al. | 360/324 |
| 2012/0281320 A1 * | 11/2012 | Singleton et al. | 360/319 |
| 2013/0044394 A1 * | 2/2013 | Stokes | 360/319 |
| 2013/0286502 A1 | 10/2013 | Erden et al. | |
| 2014/0037990 A1 | 2/2014 | Abraham et al. | |

* cited by examiner

*Primary Examiner* — Allen T Cao
(74) *Attorney, Agent, or Firm* — Thomas R. Berthold

(57) ABSTRACT

A two-dimensional magnetic recording (TDMR) read head structure has the lower read sensor free layer magnetization biased by side shields of soft magnetic material. A center shield between the lower and upper sensors is an antiparallel coupled magnetic structure, i.e., first and second ferromagnetic layers separated by an antiparallel coupling (APC) layer. The first ferromagnetic layer is ferromagnetically exchange coupled to the side shields of the lower sensor to stabilize the magnetization of the lower sensor's free layer. The first ferromagnetic layer of the center shield is a multilayer of a lower NiFe layer and an upper CoFeB alloy layer inserted below the APC layer. The CoFeB alloy insertion layer increases the antiparallel coupling of the first and second ferromagnetic layers of the center shield after two orthogonal anneals so that the magnetization of the first ferromagnetic layer is aligned parallel to the air-bearing surface (ABS) of the TDMR structure.

15 Claims, 5 Drawing Sheets

CURRENT-PERPENDICULAR-TO-THE-PLANE (CPP) MAGNETORESISTIVE (MR) SENSOR STRUCTURE WITH MULTIPLE STACKED SENSORS AND CENTER SHIELD WITH COFEB INSERTION LAYER

BACKGROUND OF THE INVENTION

1. Field of the Invention

The invention relates generally to a current-perpendicular-to-the-plane (CPP) magnetoresistive (MR) sensor structure for two-dimensional magnetic recording (TDMR).

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically copper (Cu) or silver (Ag). One ferromagnetic layer adjacent to the spacer layer has its magnetization direction fixed, such as by being pinned by exchange coupling with an adjacent antiferromagnetic layer, and is referred to as the reference or pinned layer. The other ferromagnetic layer adjacent to the spacer layer has its magnetization direction free to rotate in the presence of an external magnetic field and is referred to as the free layer. With a sense current applied to the sensor, the rotation of the free-layer magnetization relative to the pinned-layer magnetization due to the presence of an external magnetic field is detectable as a change in electrical resistance. If the sense current is directed perpendicularly through the planes of the layers in the sensor stack, the sensor is referred to as a current-perpendicular-to-the-plane (CPP) sensor.

In addition to CPP-GMR read heads, another type of CPP sensor is a magnetic tunnel junction sensor, also called a tunneling MR or TMR sensor, in which the nonmagnetic spacer layer is a very thin nonmagnetic tunnel barrier layer. In a CPP-TMR sensor the amount of tunneling current through the layers depends on the relative orientation of the magnetizations in the two ferromagnetic layers. In a CPP-TMR read head the nonmagnetic spacer layer is formed of an electrically insulating material, such as $TiO_2$, MgO or $Al_2O_3$.

A proposed technology that uses multiple CPP-MR sensors is two-dimensional magnetic recording (TDMR). In TDMR, multiple sensors that are located on a single structure access the same or adjacent data tracks to obtain signals that are processed jointly. This allows the data tracks to be placed closer together, resulting in an increase in areal data bit density. In addition to increasing areal density, TDMR may provide an increased readback data rate if data from multiple data tracks are read concurrently. A structure with multiple stacked read sensors for TDMR is described in US 2013/0286502 A1.

Each of the individual CPP-MR sensors in a TDMR read head structure is required to be located between two shields of magnetically permeable material that shield the sensors from recorded data bits that are neighboring the data bit being read. During readback, the shields ensure that each sensor reads only the information from the targeted disk region.

In a TDMR sensor structure, such as a structure with two stacked read sensors, a problem arises if the free layer of the lower read sensor has its magnetization magneto-statically biased by side shields of soft magnetic material. An antiferromagnetic layer is needed to pin the magnetization of the center shield in a direction substantially parallel to the ABS. Since the center shield is ferromagnetically exchange coupled to the side-shields of the lower sensor their magnetization is pinned substantially parallel to the ABS as well, assuring the stabilization of the free layer of the lower sensor. Because the reference or pinned layers of the two read sensors also have their magnetizations pinned by antiferromagnetic layers, but in a direction substantially perpendicular to the ABS, i.e., orthogonal to the magnetization of the center shield, at least two separate annealing steps are required. A first annealing step at high temperature is performed after formation of the upper sensor to pin the magnetizations of the lower and upper sensors' pinned layers substantially orthogonal to the ABS. This necessarily also pins the magnetization of the center shield orthogonal to the ABS. Thus after formation of the top shield above the upper sensor, a second annealing step at lower temperature is required to reset the magnetization of the center shield to be parallel to the ABS and to pin the magnetization of the top shield to be parallel to the ABS. The lower temperature is required so as to not disturb the pinned magnetizations of the upper and lower sensor which have previously been set at higher temperature. However, due to its lower temperature this second annealing step does not fully reset the magnetization of the center shield back to parallel to the ABS, which adversely affects the stabilization of the lower sensor.

What is needed is a stacked CPP-MR sensor structure for TDMR that has a center shield with magnetization fully aligned parallel to the ABS.

SUMMARY OF THE INVENTION

Embodiments of this invention relate to a TDMR read head structure wherein the lower read sensor has its free layer magnetization biased by side shields of soft magnetic material. The shared laminated center shield between the lower and upper sensors is an antiparallel coupled magnetic structure (APS), i.e., first and second ferromagnetic layers separated by an antiparallel coupling (APC) layer, that includes a CoFeB alloy insertion layer below the APC layer. The first ferromagnetic layer is ferromagnetically exchange coupled to the side shields of the lower sensor to stabilize the magnetization of the lower sensor's free layer. The CoFeB alloy insertion layer may form the entirety of the first ferromagnetic layer of the center shield, but is preferably the upper portion of a multilayer. In one embodiment the first ferromagnetic layer of the center shield is a multilayer of a lower NiFe layer and an upper CoFeB alloy layer having a composition of the form $CoFe_xB_y$, where x is in atomic percent and is greater than or equal to 4 and less than or equal to 40 and y is in atomic percent and is greater than or equal to 10 and less than or equal to 30. The CoFeB alloy insertion layer improves the smoothness of the subsequent interfaces and crystalline structure in the center shield so that after the second annealing step the magnetization of the first ferromagnetic layer is aligned parallel to the air-bearing surface (ABS) of the TDMR structure.

For a fuller understanding of the nature and advantages of the present invention, reference should be made to the following detailed description taken together with the accompanying figures.

DETAILED DESCRIPTION OF THE INVENTION

Figure 1:
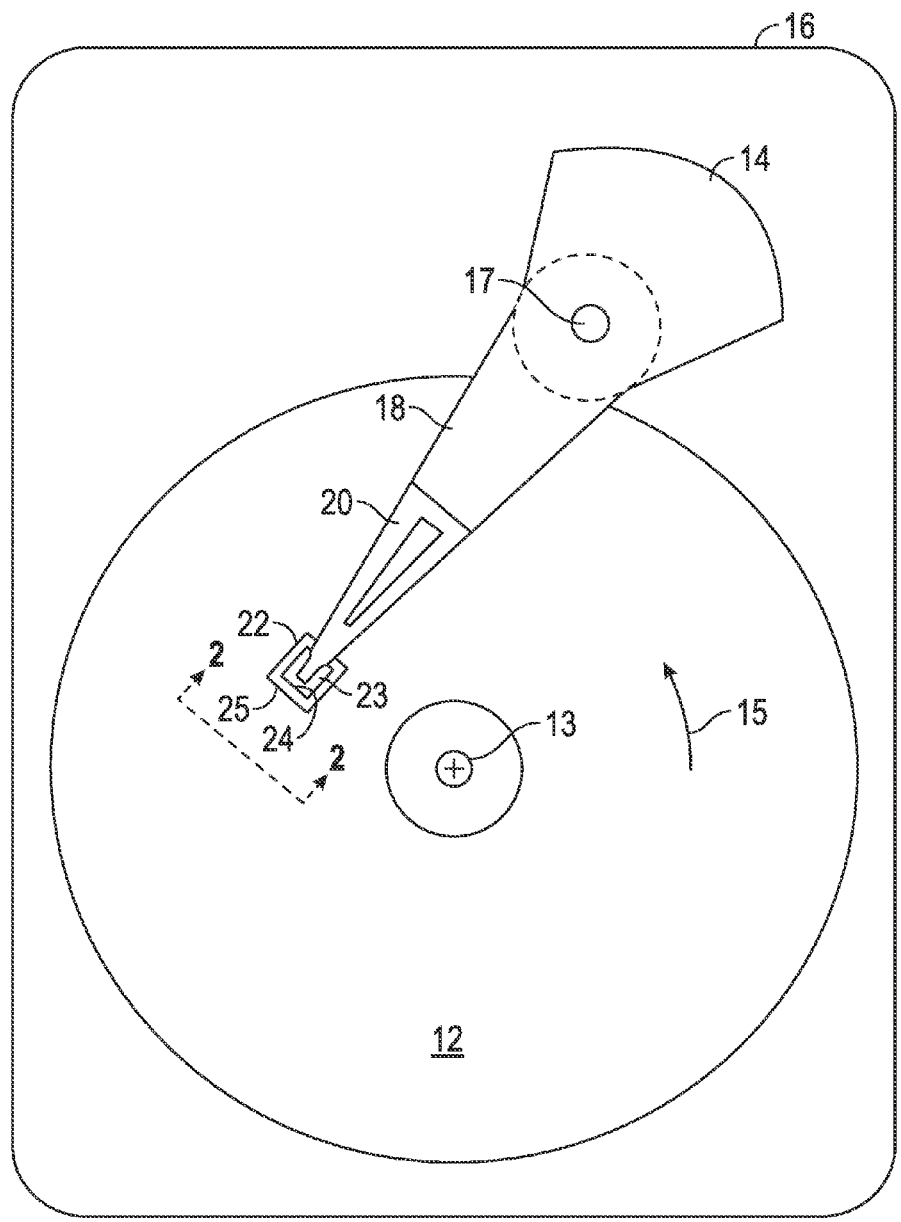
FIG. 1 is a schematic top view of a conventional magnetic recording hard disk drive with the cover removed.

The CPP magnetoresistive (MR) sensor structure of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
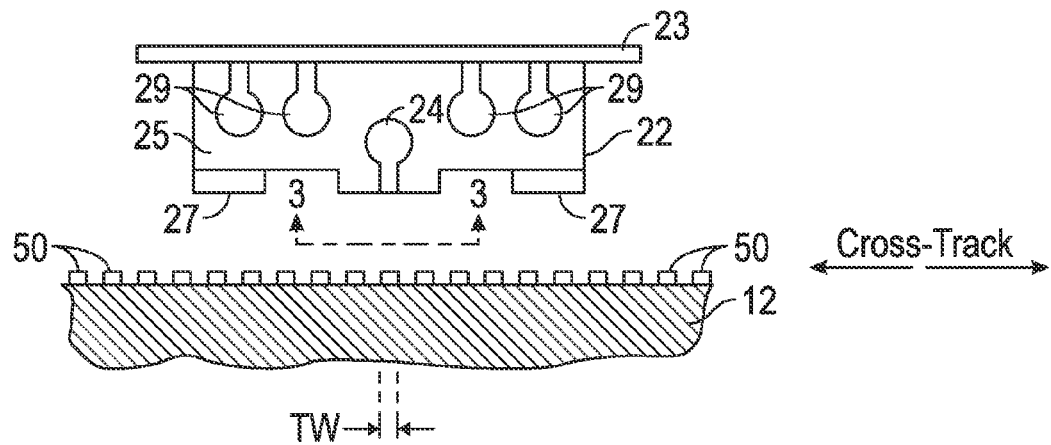
FIG. 2 is an enlarged end view of a section of the disk and a slider with a sensor structure capable of two-dimensional magnetic recording (TDMR) taken in the direction 2-2 in FIG. 1 according to the prior art.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
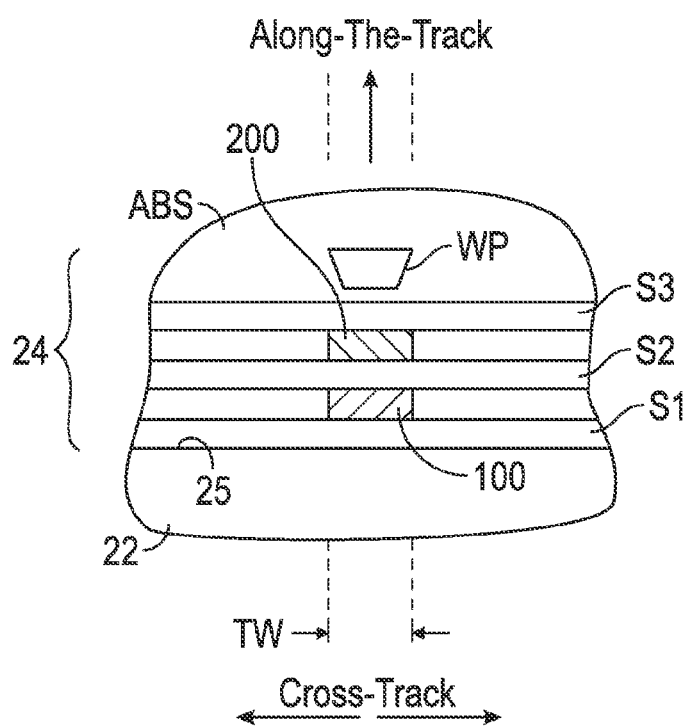
FIG. 3 is a view in the direction 3-3 of FIG. 2 and shows the ends of the write head and TDMR read head structure as viewed from the disk according to the prior art.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22, using well-known thin film head fabrication techniques. The write head includes a perpendicular magnetic write pole (WP) and may also include trailing and/or side shields (not shown).

For the purpose of explanation of this invention, the read head portion of read/write head 24 is depicted as a sensor structure of stacked multiple CPP-MR read sensors 100, 200 for use in a disk drive with TDMR. In this example both read sensors 100, 200 are aligned with one another (vertically in FIG. 3) so as to read the same data track with trackwidth (TW). Sensors 100 and 200 however may also be laterally offset from each other to adjust for skew, to read different portions of the same track, or to read separate tracks. Lower read sensor 100 is located between two magnetic shields, lower shield S1 and center shield S2. Upper read sensor 200 is also located between two magnetic shields, center shield S2 and upper shield S3. The shields S1, S2, S3 are formed of magnetically permeable material and are also electrically conductive so they can function as the electrical leads to the read sensors 100 and 200. The shields function is to shield the read sensors 100 and 200 from recorded data bits that neighbor the data bit being read. FIG. 3 is not to scale because of the difficulty in showing very small dimensions. Typically shields S1 and S3 may be each be up to several microns thick in the along-the-track direction, as compared to the total thickness of each read sensor 100, 200 in the along-the-track direction, which may be in the range of 20 to 40 nm.

Figure 4:
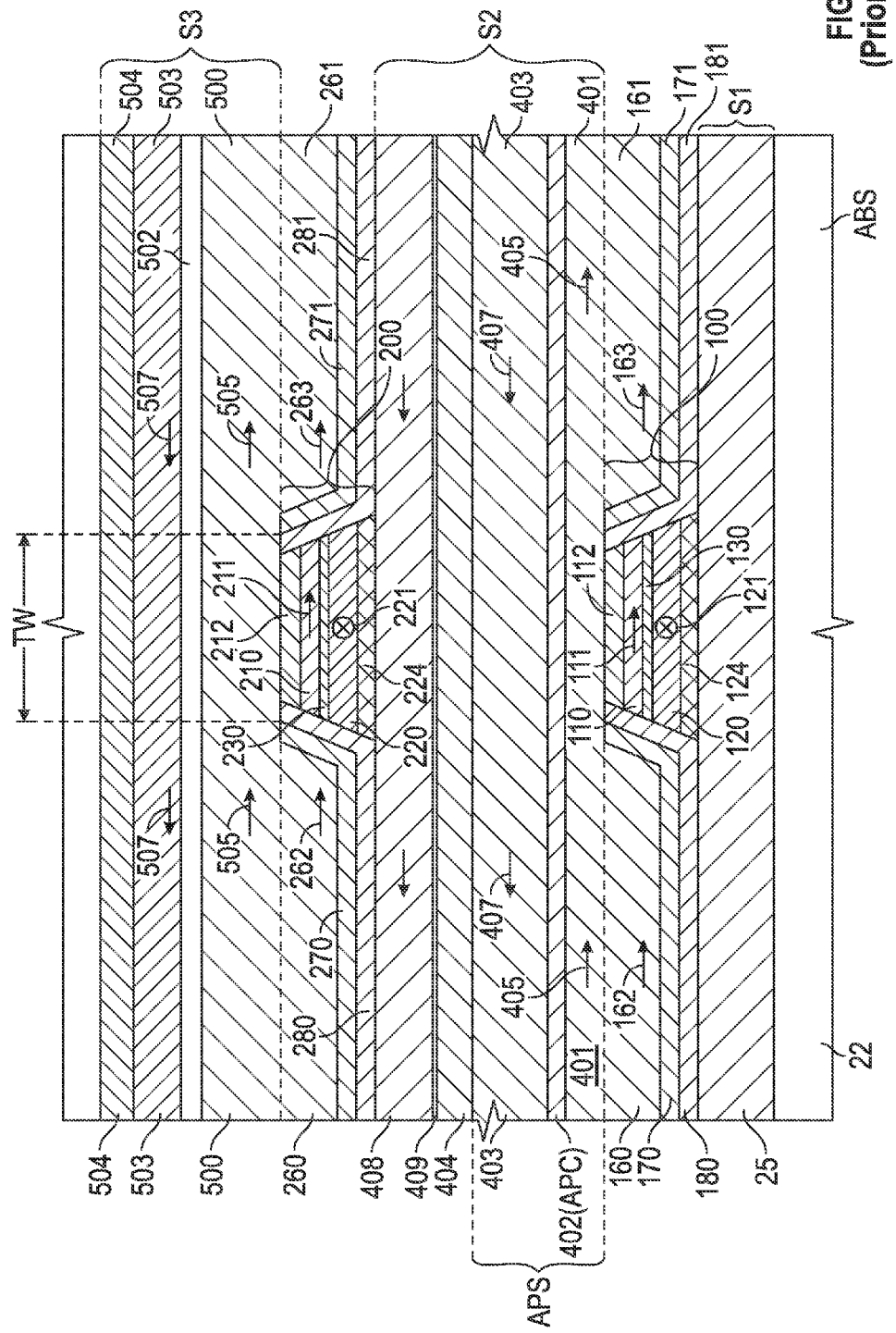
FIG. 4 is view of the air-bearing surface (ABS) showing the layers making up one type of a stacked CPP-MR sensor structure for TDMR according to the prior art as would be viewed from the disk.

FIG. 4 is a view of the ABS showing the layers making up one type of a stacked CPP-MR sensor structure according to the prior art as would be viewed from the disk. The lower sensor 100 is generally aligned along the same TW as upper sensor 200, but the two sensors could be laterally misaligned to adjust for skew, to read different portions of the same data track, or to read adjacent tracks.

Lower sensor 100 is located on lower or bottom shield S1, which is located on the slider substrate, i.e., the trailing surface 25 of slider 22 (see FIG. 3). The sensor 100 layers include a reference or pinned ferromagnetic layer 120 having a fixed magnetic moment or magnetization direction 121 oriented orthogonal to the ABS (into the page), a free ferromagnetic layer 110 having a magnetic moment or magnetization direction 111 oriented substantially parallel to the ABS but that can rotate in the plane of layer 110 in response to transverse external magnetic fields from the disk, and a nonmagnetic spacer layer 130 between the pinned layer 120 and free layer 110. The CPP-MR sensor 100 may be a CPP GMR sensor, in which case the nonmagnetic spacer layer 130 would be formed of an electrically conducting material, typically a metal like Cu or Ag. Alternatively, the CPP-MR sensor 100 may be a CPP tunneling MR (CPP-TMR) sensor, in which case the nonmagnetic spacer layer 130 would be a tunnel barrier formed of an electrically insulating material, like $TiO_2$, MgO or $Al_2O_3$. The pinned layer 120 may have its magnetization direction pinned substantially orthogonal to the ABS by being exchange-coupled to an antiferromagnetic (AF) layer 124. The AF layer 124 is typically a Mn alloy, e.g., PtMn, NiMn, FeMn, IrMn, PdMn, PtPdMn or RhMn. Pinned layer 120 may be a simple pinned or an antiparallel pinned structure. A nonmagnetic capping layer 112, which may be a single layer or multiple layers of different materials, such as Ru, Ta and Ti, located above the free ferromagnetic layer 110 provides corrosion protection, and adjusts the free layer to shield spacing.

In the presence of an external magnetic field in the range of interest, i.e., magnetic fields from recorded data on the disk, the magnetization direction 111 of free layer 110 will rotate while the magnetization direction 121 of pinned layer 120 will remain fixed and not rotate. Thus when a sense current is applied from top shield perpendicularly through the sensor 100 layers, the magnetic fields from the recorded data on the disk will cause rotation of the free-layer magnetization 111 relative to the pinned-layer magnetization 121, which is detectable as a change in electrical resistance.

The structure, function and method of fabrication of CPP-MR sensor 100 are well-known and thus not described in detail in this application. Upper sensor 200 with corresponding 200 series numbered items is substantially identical in structure and function to sensor 100.

Side shields 160, 161 of soft magnetic material are formed outside of sensor 100, near the side edges of the sensor 100, particularly near the side edges of free layer 110. The side shields 160, 161 have magnetizations 162, 163, respectively, and thus longitudinally bias the magnetization 111 of free layer 110. Seed layers 170, 171 are located below the side shields 160, 161 and insulating layers 180, 181 are located below the seed layers 170, 171. The seed layers 170, 171 and side shields 160, 161 are electrically insulated from side edges of sensor 100 by electrically insulating layers 180, 181, which are typically formed of alumina ($Al_2O_3$), a silicon nitride ($SiN_x$) or another metal oxide like a Ta oxide or a Ti oxide. The side shields 160, 161 are formed of "soft" magnetic material, meaning material that can be easily magnetized and demagnetized at low magnetic fields. The soft magnetic material is preferably an alloy comprising Ni and Fe with permeability ($\mu$) preferably greater than 100. The side shields may be formed of any of the well-known materials used for conventional magnetic shields, for example NiFe alloys wherein Ni is present in the NiFe alloy in an amount between 40 and 99 atomic percent (at. %). Alternatively, other soft ferromagnetic materials may be used, like NiFeCr, NiFeMo, CoZrTa, CoZrNb and CoFeZr alloys. More specific compositions for the side shield material include $(NiFe_x)Mo_y$ and $(NiFe_x)Cr_y$, where x is between 1 and 25 and y is between 1 and 8, where the subscripts are in atomic percent.

Upper sensor 200 comprises antiferromagnetic layer 224, pinned layer 220 with its magnetization 221 orthogonally pinned to the ABS, spacer layer 230, free layer 210 with its magnetization 211 oriented substantially parallel to the ABS but free to rotate, and a nonmagnetic cap 212. Upper sensor 200 also includes side shields 260, 261 with magnetizations 262, 263; seed layers 270, 271; and insulating layers 280, 281. The side shields 260, 261 may have the same structure, composition and function as previously described side shields 160, 161.

Center shield S2 is a laminated shared shield between lower sensor 100 and upper sensor 200. Shared center shield S2 includes a lower antiparallel structure (APS) comprising soft magnetic layers 401, 403 antiferromagnetically coupled by antiparallel coupling (APC) layer 402, and antiferromagnetic (AF) pinning layer 404 exchange coupled to layer 403. The APC layer 402 is typically Ru, Ir, Rh, Cr or alloys thereof with a thickness chosen to induce AF coupling between the layers 401, 403. A typical thickness of the APC is between about 7-9 Å, but the optimum thickness will depend on the composition of the magnetic materials chosen for layers 401 and 403 on both sides of the APC. The AF layer 404 is preferably IrMn (where Mn is between about 70 and 85 atomic percent), or any other known AF material, like PtMn, NiMn, FeMn, PdMn, PtPdMn, or RhMn. As a result of the antiferromagnetic coupling across APC layer 402 the layers 401, 403 have their respective magnetizations 405, 407 oriented antiparallel. Center shield S2 also includes a soft magnetic layer 408 below upper sensor 200 and a nonmagnetic decoupling layer 409 that separates layer 408 from AF layer 404. Because lower sensor 100 utilizes soft side shields 160, 161, layer 401 of center shield S2 is required to have a relatively fixed magnetization 405 to assist in stabilizing the magnetizations 162, 163 of side shields 160, 161, respectively. Thus AF pinning layer 404 is required to pin the magnetization 407 of layer 403 substantially parallel to the ABS, which results in the relatively fixed magnetization 405 of layer 401 due to antiferromagnetic coupling across APC layer 402 and thus in stabilizing the magnetizations 162, 163 of the side shields 160, 161, substantially parallel to the ABS as well.

Upper shield S3 is magnetically connected to side shields 260 and 261 and includes an antiparallel structure (APS) comprising soft magnetic layers 500, 503 antiferromagnetically coupled by antiparallel coupling (APC) layer 502, and antiferromagnetic (AF) pinning layer 504 exchange coupled to layer 503. As in the APS for S2, APC layer 502 is typically Ru, Ir, Rh, Cr or alloys thereof with a thickness chosen to induce AF coupling between the layers 500, 503 with typical thickness of the APC is between about 7-9 Å, but the optimum thickness will depend on the composition of the magnetic materials chosen for layers 500 and 503 on both sides of the APC. As a result of the antiferromagnetic coupling across APC layer 502 the layers 500, 503 have their respective magnetizations 505, 507 oriented antiparallel. The AF pinning layer 504 is required to pin the magnetization 507 of layer 503 substantially parallel to the ABS, which results in the relatively fixed magnetization 505 of layer 500 due to antiferromagnetic coupling across APC layer 502 and thus in stabilizing the magnetizations 262, 263 of the side shields 260, 261, substantially parallel to the ABS as well.

The sensor structure of FIG. 4 is depicted with APS structures as part of the center shield S2 and the top shield S3. However, a "simple" or single pinned structure is also possible for both structures in which APC layer 402 is not required and layers 401, 403 are replaced by a single soft magnetic layer which has its magnetization pinned by AF layer 404 and APC layer 502 is not required and layers 500 and 503 are replaced by a single soft magnetic layer which has its magnetization pinned by AF layer 504.

As is well known in the art the soft ferromagnetic material for use in shields S1, S2 and S3 may be a NiFe alloy, for example wherein Ni is present in the NiFe alloy in an amount between 40 and 99 atomic percent (at. %). Alternatively, other soft ferromagnetic materials may be used, like NiFeCr, NiFeMo, CoZrTa, CoZrNb and CoFeZr alloys.

Figure 5C:
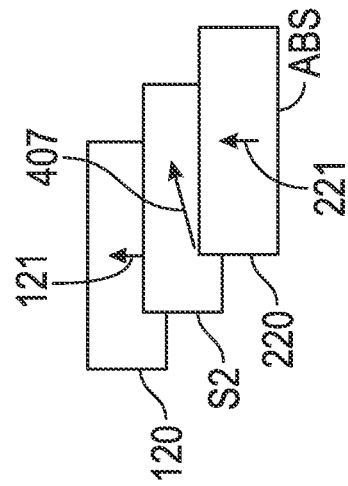
FIGS. 5A-5C are views depicting the magnetizations of various layers of the TDMR sensor structure according to the prior art following the annealing steps.
Figure 5B:
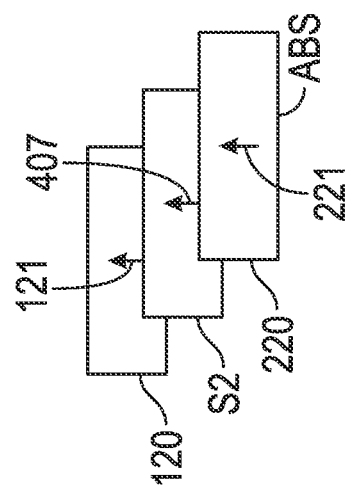
Figure 5A:
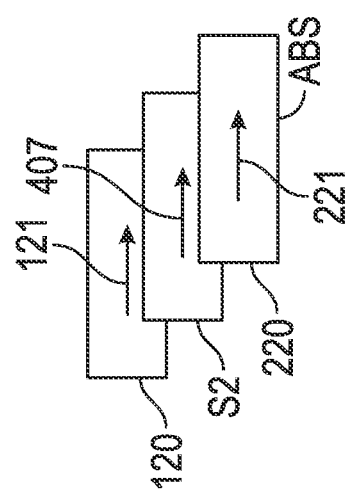

A problem with the structure of FIG. 4 arises as a result of the fabrication process. FIG. 5A shows the magnetization 121 of pinned layer 120, the magnetization 407 of center shield S2 and the magnetization 221 of pinned layer 220 after fabrication of the upper sensor 200 and before formation of the upper shield S3. A first annealing step in the presence of an applied magnetic field is then required to pin the magnetization 121 of pinned layer 120 of the lower sensor 100 and the magnetization 221 of pinned layer 220 of the upper sensor 200 substantially orthogonal to the ABS via exchange bias with antiferromagnetic layers 124, 224, respectively. However, as shown in FIG. 5B, this first annealing step also changes the magnetization 407 of the center shield S2 to be orthogonal to the ABS via exchange bias with antiferromagnetic layer 404. Thus, after the upper shield S3 is formed, a second annealing step in the presence of an applied magnetic field is required to reset the magnetization 407 of center shield S2 via exchange bias with antiferromagnetic layer 404 so it is substantially parallel to the ABS and thus orthogonal to the previously set magnetizations 121, 221 of pinned layers 120, 220, respectively. This second annealing step is done at a temperature (e.g., between about 150 and 250° C.) lower than the first anneal temperature (e.g., between about 250 and 350° C.) so as to not disturb the previously set magnetizations 121, 221. However, this second annealing step at lower temperature will not be able to fully reset the pinned layer magnetization 407 of the center shield S2 to be parallel to the ABS, as depicted in FIG. 5C. For this to occur the temperature would have to be increased, which would result in upsetting the previously set magnetization 121 of pinned layer 120 and magnetization 221 of pinned layer 220. As a result the magnetization 405 of layer 401 of center shield S2 will not be able to fully stabilize the magnetizations 162, 163 of side shields 160, 161, respectively, which will adversely affect the performance of the lower sensor 100.

Embodiments of this invention relate to a sensor structure for TDMR that has an amorphous CoFeB alloy layer inserted below the APC layer of the center shield. This insertion layer improves the smoothness of the subsequent interfaces and resets the crystalline structure in such a way that after the lower-temperature second annealing step the magnetization of the center shield is reset to be substantially parallel to the ABS.

Figure 6:
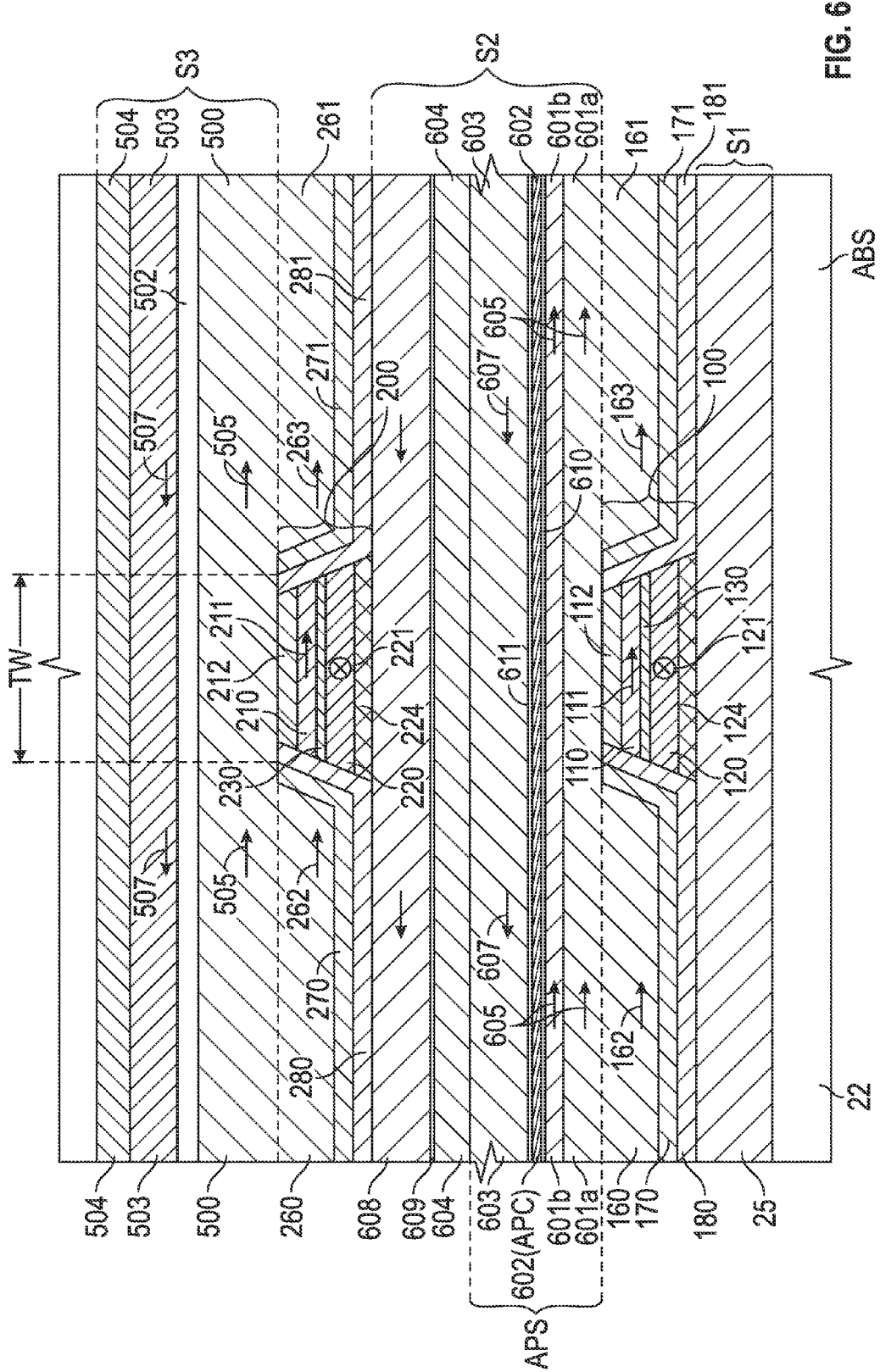
FIG. 6 is view of the ABS showing the layers making up an embodiment of a stacked CPP-MR sensor structure for TDMR as would be viewed from the disk according to the invention.

One embodiment is depicted in FIG. 6, which is a view of the ABS. The bottom shield S1, lower sensor 100, upper sensor 200 and top shield S3 are substantially the same as in FIG. 4. The center shield S2 is a laminated shared shield between lower sensor 100 and upper sensor 200. Shared center shield S2 includes a lower antiparallel structure (APS) comprising lower soft magnetic multilayer 601a/601b and upper soft magnetic layer 603 that are antiferromagnetically coupled by antiparallel coupling (APC) layer 602, and antiferromagnetic (AF) pinning layer 604 exchange coupled to layer 603. The APC layer 602 is typically Ru, Ir, Rh, Cr or alloys thereof with a thickness chosen to induce AF coupling between the layers 601a/601b and 603. A typical thickness of the APC is between about 7-9 Å, but the optimum thickness will depend on the composition of the magnetic materials chosen for layers 601a/601b and 603 on both sides of the APC. In the embodiment of FIG. 6, thin (about 6 to 20 Å) Co nanolayers 610, 611 are located on the sides of APC layer 602. As a result of the antiferromagnetic coupling across APC layer 602 the layers 601a/601b and 603 have their respective magnetizations 605, 607 oriented antiparallel. Center shield S2 also includes a soft magnetic layer 608 below upper sensor 200 and a nonmagnetic decoupling layer 609 that separates layer 608 from AF layer 604. The AF layer 604 is preferably IrMn or any other known AF material, like PtMn, NiMn, FeMn, PdMn, PtPdMn, or RhMn. IrMn has a preferred Mn content between about 70 and 85 atomic percent and a thickness range of 50 to 80 Å, where an optimum thickness is about 60 Å, to lower the blocking temperature sufficiently to enable a reset substantially parallel to the ABS upon the second low temperature anneal between about 150 and 250° C.

Because lower sensor 100 utilizes soft side shields 160, 161, multilayer 601a/601b of center shield S2 is required to have a relatively fixed magnetization 605 to assist in stabilizing the magnetizations 162, 163 of side shields 160, 161, respectively. Thus AF pinning layer 604 is required to pin the magnetization 607 of layer 603 substantially parallel to the ABS, which results in the relatively fixed magnetization 605 of multilayer 601a/601b due to antiferromagnetic coupling across APC layer 602 and thus in stabilizing the magnetizations 162, 163 of the side shields 160, 161, substantially parallel to the ABS as well. Unlike the prior art of FIG. 4, in the embodiment of FIG. 6 the magnetization 607 becomes reset substantially parallel to the ABS after the lower-temperature second annealing step as a result of the improved smoothness of the subsequent interfaces and crystalline structure due to the presence of a CoFeB alloy insertion layer 601b below the Co nanolayer 610. Layer 601b is an amorphous CoFeB alloy, preferably with a composition of $CoFe_xB_y$, where x is in atomic percent and is greater than or equal to 4 and less than or equal to 40 and y is in atomic percent and is greater than or equal to 10 and less than or equal to 30. The entire layer 601 may be formed of the CoFeB alloy, but preferably the layer 601 is a multilayer of lower layer 601a, which may be a NiFe alloy, and an upper layer 601b of the CoFeB alloy. The total thickness of the multilayer 601a/601b is preferably between 100 to 500 Å, with the CoFeB layer thickness preferably in the range of about 10-50 Å.

The CoFeB insertion layer of the described composition and thickness is amorphous or nano-crystalline and thus significantly reduces interfacial roughness of the subsequent layers in the laminated shared shield. This provides for sharper interfaces and an improved crystalline texture and thus leads to higher pinning after reset, as observed by comparing magnetic hysteresis loops of the shared shield stacks of the present invention with that of the prior art. For example, a laminated shared shield with a 50 Å $CoFe_8B_{20}$ insertion layer exhibits up to 40% smaller interfacial roughness of the subsequent layers and an up to 25% improved IrMn texture as judged by the full width at half maximum of the (111) IrMn reflection (as determined by X-ray reflectivity and diffraction).

A preferred shared shield structure according to the present invention is 601a-244 Å NiFe/601b-50 Å CoFeB/610-8 Å Co/602-7.8 Å Ru/611-8 Å Co/603-(214 Å NiFe+24 Å CoFe)/604-60 Å IrMn/609-30 Å Ru/608-330 Å NiFe.

The signal-to-noise ratio (SNR) for the lower sensor in the TDMR sensor structure utilizing CoFeB insertion layers was significantly improved and similar to the SNR of the upper sensor as compared to the lower sensor in the TDMR sensor structure of the prior art. This is due to the increased stabilization provided by the improved laminated shared shield with CoFeB that has its magnetization being reset substantially more parallel to the ABS as compared to the prior art laminated shared shield. While the preferred material for the insertion layer below the APC layer in the center shield is CoFeB, other materials may be added. Thus the CoFeB alloy may also include one or more of Zr, Ta, Nb, Cu, Si, and P.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor structure for sensing magnetically recorded data from a magnetic recording medium, the structure comprising:
   a substrate;
   a bottom magnetic shield on the substrate;
   a first magnetoresistive sensor on the bottom magnetic shield and having a front edge for facing a magnetic recording medium and two side edges, the first sensor comprising a ferromagnetic free layer having a magnetization oriented generally parallel to said first sensor front edge and a pinned ferromagnetic layer having a magnetization oriented generally orthogonal to said first sensor front edge;
   a side shield of magnetically permeable material adjacent to each side edge of the first sensor free layer and having a magnetization generally parallel to the magnetization of the first sensor free layer for biasing the magnetization of the first sensor free layer;

a center magnetic shield comprising a first ferromagnetic layer on the first sensor and the first sensor side shields, a second ferromagnetic layer, an antiparallel coupling (APC) layer between said first and second ferromagnetic layers that couples said first and second ferromagnetic layers together antiferromagnetically, an antiferromagnetic layer exchange coupled to the second ferromagnetic layer for pinning the magnetization of the second ferromagnetic layer substantially orthogonal to the pinned layer of the first sensor, a third ferromagnetic layer, and a nonmagnetic decoupling layer between the second and third ferromagnetic layers, wherein the first ferromagnetic layer comprises a layer of an alloy comprising Co, Fe and B; and a second magnetoresistive sensor on the third ferromagnetic layer of the center shield and having a front edge for facing a magnetic recording medium and two side edges, the second sensor comprising a ferromagnetic free layer having a magnetization oriented generally parallel to said second sensor front edge and a pinned ferromagnetic layer having a magnetization oriented generally orthogonal to said second sensor front edge.

2. The sensor structure of claim 1 wherein the first ferromagnetic layer of the center shield comprises a multilayer of a NiFe alloy layer on the first sensor and a CoFeB alloy layer on the NiFe alloy layer.

3. The sensor structure of claim 1 further comprising a lower Co nanolayer between the CoFeB alloy layer and the APC layer and an upper Co nanolayer between the APC layer and the center shield's second ferromagnetic layer.

4. The sensor structure of claim 1 wherein the first ferromagnetic layer of the center shield has a thickness greater than or equal to 100 Å and less than or equal to 500 Å.

5. The sensor structure of claim 1 wherein the CoFeB alloy layer has a composition of the form $CoFe_xB_y$, where x is in atomic percent and is greater than or equal to 4 and less than or equal to 40 and y is in atomic percent and is greater than or equal to 10 and less than or equal to 30.

6. The sensor structure of claim 1 wherein the CoFeB alloy further comprises one or more of Zr, Ta, Nb, Cu, Si, and P.

7. The sensor structure of claim 1 wherein the antiferromagnetic layer of the center shield comprises a IrMn alloy having a thickness greater than or equal to 50 Å and less than or equal to 80 Å.

8. The sensor structure of claim 1 wherein the APC layer is selected from Ru, Ir, Rh, Cr and their alloys.

9. The sensor structure of claim 1 further comprising:
a side shield of magnetically permeable material adjacent each side edge of the second sensor free layer and having a magnetization generally parallel to the magnetization of the second sensor free layer for biasing the magnetization of the second sensor free layer; and
a top magnetic shield comprising a lower ferromagnetic layer on the second sensor and the second sensor side shields, an upper ferromagnetic layer, an antiparallel coupling (APC) layer between said lower and upper ferromagnetic layers that couples said lower and upper ferromagnetic layers together antiferromagnetically, and an antiferromagnetic layer exchange coupled to the upper ferromagnetic layer for pinning the magnetization of the upper ferromagnetic layer substantially orthogonal to the pinned layer of the second sensor.

10. A current-perpendicular-to-the-plane magnetoresistive (CPP-MR) read head structure for a two-dimensional magnetic recording (TDMR) disk drive comprising:
an air-bearing slider having an air-bearing surface (ABS) for facing the disk and a trailing surface generally orthogonal to the ABS;
a bottom magnetic shield on the trailing surface;
a first CPP-MR read head on the bottom magnetic shield and having a front edge for facing the disk and two spaced-apart side edges, the first read head comprising a ferromagnetic free layer having a magnetization oriented generally parallel to the ABS and a pinned ferromagnetic layer having a magnetization oriented generally orthogonal to the ABS;
a side shield of magnetically permeable material adjacent each side edge of the first read head free layer and having a magnetization generally parallel to the magnetization of the first read head free layer for biasing the magnetization of the first read head free layer;
a second CPP-MR read head comprising a ferromagnetic free layer having a magnetization oriented generally parallel to the ABS and a pinned ferromagnetic layer having a magnetization oriented generally orthogonal to the ABS; and
a laminated shared magnetic shield between the first and second CPP-MR read heads, the shared shield comprising a NiFe alloy layer on the first read head and the first read head side shields, a CoFeB alloy layer on the NiFe alloy layer, a lower Co nanolayer on the CoFeB alloy layer, an antiparallel coupling (APC) layer on the lower Co nanolayer, an upper Co nanolayer on the APC layer, an upper ferromagnetic layer on the Co nanolayer, and an antiferromagnetic layer exchange coupled to the upper ferromagnetic layer for pinning the magnetization of the upper ferromagnetic layer substantially orthogonal to the pinned layer of the first sensor, wherein the APC layer antiferromagnetically couples the upper ferromagnetic layer with the NiFe alloy layer and CoFeB alloy layer, whereby the NiFe alloy layer and CoFeB alloy layer have magnetizations antiparallel to the magnetization of the upper ferromagnetic layer.

11. The read head structure of claim 10 wherein the CoFeB alloy layer has a composition of the form $CoFe_xB_y$, where x is in atomic percent and is greater than or equal to 4 and less than or equal to 40 and y is in atomic percent and is greater than or equal to 10 and less than or equal to 30.

12. The read head structure of claim 10 wherein the CoFeB alloy further comprises one or more of Zr, Ta, Nb, Cu, Si, and P.

13. The read head structure of claim 10 wherein the CoFeB alloy layer has a thickness greater than or equal to 10 Å and less than or equal to 50 Å.

14. The read head structure of claim 10 wherein the APC layer is selected from Ru, Ir, Rh, Cr and their alloys.

15. The read head structure of claim 10 wherein each of the first and second read heads is a tunneling magnetoresistive read head.

* * * * *